(No Model.)

A. MAXWELL.
TRACE CARRIER.

No. 321,123. Patented June 30, 1885.

Witnesses:
Theo. L. Popp
Geo. E. Pitman

Andrew Maxwell Inventor.
By Wilhelm Bonner
Attorneys.

UNITED STATES PATENT OFFICE.

ANDREW MAXWELL, OF MOUNT STERLING, ILLINOIS, ASSIGNOR OF ONE-HALF TO PRATT & LETCHWORTH, OF BUFFALO, NEW YORK.

TRACE-CARRIER.

SPECIFICATION forming part of Letters Patent No. 321,123, dated June 30, 1885.

Application filed November 11, 1884. (No model.)

*To all whom it may concern:*

Be it known that I, ANDREW MAXWELL, of Mount Sterling, in the county of Brown and State of Illinois, have invented new and useful Improvements in Trace-Carriers, of which the following is a specification.

This invention relates to an improved trace-carrier, which is fastened to the end of the trace and adapted to couple with the cockeye on the opposite trace and support the trace over the horse's back when detached from the whiffletree.

My invention consists of the improvements which will be hereinafter fully described, and pointed out in the claim.

Figure 1:
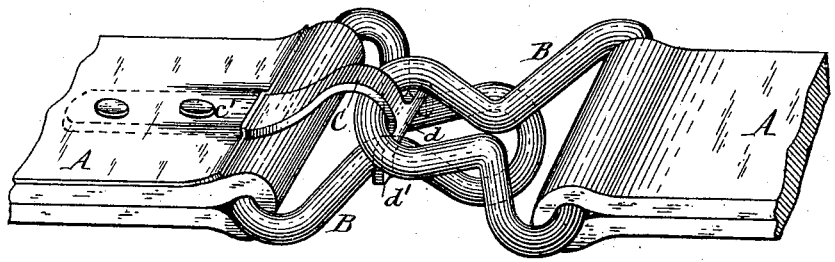
Figure 2:
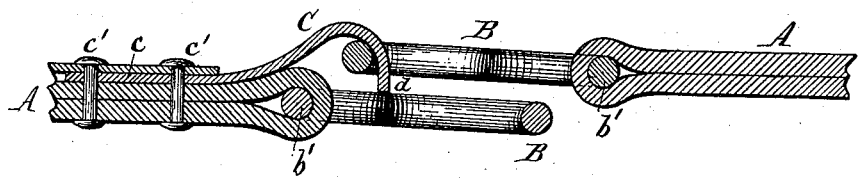
Figure 3:
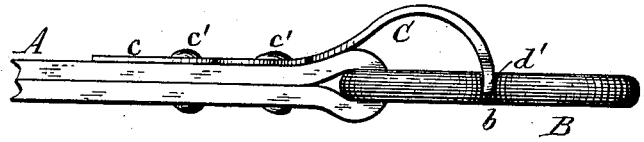

In the accompanying drawings, Figure 1 represents a perspective view of the ends of the traces coupled together by my improved trace-carrier. Fig. 2 is a longitudinal section thereof. Fig. 3 is an end view, and Fig. 4 a side elevation, of the end of a trace provided with my improved trace carrier.

Like letters of reference indicate corresponding parts in the several figures.

A represents the ends of the traces, and B the cockeyes secured thereto in the usual manner.

Figure 4:
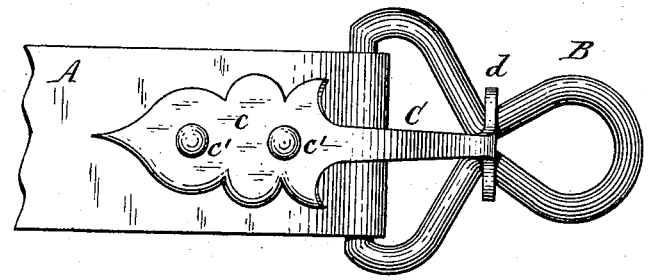

C represents my improved trace-carrier, which is fastened to the end of the trace by a shank, $c$, and rivets $c'$. The shank $c$ may be inserted through a slot cut in the trace, so as to rest between two thicknesses of the trace, as shown in Figs. 1 and 2, or the shank may be ornamented and fastened on the outside of the trace, as shown in Figs. 3 and 4. The trace-carrier C is curved outward from the end of the trace and extends partly over the cockeye, and its end is turned inward toward the cockeye and is provided with a cross-bar, $d$, forming a T-shaped hook which rests on the neck or shank $b$ of the cockeye. The ends $d'$ of the cross-bar $d$ are curved inward and straddle the neck or narrow portion $b$ of the cockeye when the cockeye is attached to the whiffletree, whereby the ends of the hook are out of the way and the hook is prevented from accidentally attaching itself to passing objects, or the tail of the horse from catching on the hook.

When the traces are detached from the whiffletree, the hook is exposed by swinging the cockeye on its cross-bar $b'$ away from the hook, and when in this position the cockeye on the opposite trace can be readily attached to the hook by inserting the cross-bar $d$ through the loop of the cockeye, so that the sides of the loop will rest in the cross-bar $d$, as shown in Fig. 1. The ends of the traces, when coupled in this manner, can be supported over the back of the horse away from the ground, and can be readily uncoupled when desired.

My improved trace-carrier can be attached to any harness, and is especially desirable in harness where the hip-straps and breeching are dispensed with, and the traces can be readily coupled and supported over a fly-net or blanket, when either is used, without removing them from the harness. My improved trace-carrier can be readily cast of suitable metal at comparatively small expense.

I claim as my invention—

The combination, with the trace and cockeye, of a trace-carrier, C, composed of a shank, $c$, having an upward bend, which is secured to the trace, and an end-bar, $d$, which is adapted to engage in the opposite cockeye, sufficient space being left between the shank and the adjacent cockeye for the insertion of the opposite cockeye, substantially as set forth.

Witness my hand this 16th day of October, 1884.

ANDREW MAXWELL.

Witnesses:
WILLIAM MUMFORD,
ROSS CHURCHILL.